(12) United States Patent
Axelrod et al.

(10) Patent No.: US 8,935,992 B2
(45) Date of Patent: Jan. 20, 2015

(54) ANIMAL CHEW INCLUDING INTERCHANGEABLE COMPONENTS

(75) Inventors: Glen S. Axelrod, Colts Neck, NJ (US); Ajay Gajria, Maharashtra (IN)

(73) Assignee: T.F.H. Publications, Inc., Neptune City, NJ (US)

( * ) Notice: Subject to any disclaimer, the term of this patent is extended or adjusted under 35 U.S.C. 154(b) by 168 days.

(21) Appl. No.: 13/026,099

(22) Filed: Feb. 11, 2011

(65) Prior Publication Data
US 2012/0204809 A1 Aug. 16, 2012

(51) Int. Cl.
A01K 29/00 (2006.01)
A01K 11/00 (2006.01)
A01K 15/02 (2006.01)

(52) U.S. Cl.
CPC .............. A01K 15/026 (2013.01); A01K 15/025 (2013.01)
USPC ......................................................... 119/709

(58) Field of Classification Search
CPC ........................... A01K 15/025; A01K 15/026
USPC .......... 119/702–711; 220/320, 319, 327, 326, 220/315; 215/276, 275, 274, 286, 280, 216
See application file for complete search history.

(56) References Cited

U.S. PATENT DOCUMENTS

| | | | |
|---|---|---|---|
| 2,818,293 A | 12/1957 | Klein et al. | |
| 3,690,495 A * | 9/1972 | Turner | 215/220 |
| 4,319,690 A * | 3/1982 | Birrell et al. | 215/220 |
| 4,782,965 A * | 11/1988 | Wassilieff | 215/220 |
| 7,063,044 B2 * | 6/2006 | Handelsman et al. | 119/709 |
| 7,360,504 B2 | 4/2008 | Axelrod | |
| 7,389,748 B2 * | 6/2008 | Shatoff et al. | 119/707 |
| 7,470,081 B2 | 12/2008 | Miyahara et al. | |
| 7,490,579 B2 | 2/2009 | Axelrod | |
| 7,694,653 B2 | 4/2010 | Axelrod | |
| 7,810,455 B2 | 10/2010 | Axelrod et al. | |

(Continued)

FOREIGN PATENT DOCUMENTS

| | | |
|---|---|---|
| CN | 2607027 | 3/2004 |
| CN | 1741738 | 3/2006 |

(Continued)

OTHER PUBLICATIONS

International Search Report and Written Opinion from corresponding PCT Application No. PCT/US12/024674 dated May 21, 2012.

(Continued)

*Primary Examiner* — Monica Williams
*Assistant Examiner* — Joshua Huson
(74) *Attorney, Agent, or Firm* — Grossman, Tucker, Perreault & Pfleger, PLLC

(57) ABSTRACT

An animal chew including a body and an end assembly. The body may include a first rotating mechanical fastener. The end assembly may be removably affixed to the body and may include a nut, an end knob and a resilient member. The nut may include a second rotating mechanical fastener and a first coupling feature. The end knob may include an opening defined in a first end wherein at least a portion of the nut is received, the opening defined by a side wall and an end wall, including a structure in the side wall to retain the nut. The end knob may also include a second coupling feature to engage the first coupling feature of the nut. A resilient member may bias the first and second coupling features in a disengaged configuration.

18 Claims, 16 Drawing Sheets

(56) References Cited

U.S. PATENT DOCUMENTS

| | | |
|---|---|---|
| 8,413,611 B2 | 4/2013 | Axelrod |
| 2004/0134446 A1* | 7/2004 | Keller .......................... 119/707 |
| 2004/0195197 A1* | 10/2004 | Miceli et al. ................. 215/219 |
| 2005/0166865 A1* | 8/2005 | Handelsman et al. ........ 119/709 |
| 2006/0060154 A1 | 3/2006 | Wesely |
| 2006/0225667 A1 | 10/2006 | Handelsman et al. |
| 2009/0078214 A1* | 3/2009 | Mann ............................ 119/709 |
| 2009/0095231 A1* | 4/2009 | Axelrod et al. ............... 119/709 |
| 2009/0217885 A1 | 9/2009 | Peter et al. |
| 2010/0313527 A1* | 12/2010 | Jajoo et al. ..................... 53/492 |
| 2011/0011351 A1 | 1/2011 | Simoni |

FOREIGN PATENT DOCUMENTS

| | | |
|---|---|---|
| CN | 1953656 | 4/2007 |
| CN | 101193551 | 6/2008 |
| CN | 101222843 | 7/2008 |
| CN | 101511167 | 8/2009 |

OTHER PUBLICATIONS

Office Action from corresponding Chinese Application No. 201280013448.6 dated May 20, 2014.

* cited by examiner

ANIMAL CHEW INCLUDING INTERCHANGEABLE COMPONENTS

FIELD

This disclosure relates to animal chews and, more particularly, to a pet chew which includes removable end assemblies allowing for replacement of components forming the pet chew. The end assemblies may include a locking mechanism for preventing the end assemblies from being inadvertently removed.

BACKGROUND

Many animals, particularly dogs, enjoy chewing on things, although preferences may vary as to the hardness of the substances favored. Some dogs may like to chew on very hard materials such as cow bones, wood and nylon, while others may prefer softer chews such as polyurethane or rubber or starch-based edible formulations. Still others may favor freeze dried snacks. Some dogs, due to their age, may not be able to chew on very hard substances. Young dogs may have insufficiently developed teeth, while old dogs may have diseased gums or may have lost some of their teeth. Accordingly, softer and more readily consumable chews may be preferred.

Pet toys such as dog chews may be produced in nearly any shape by melt processing, particularly bone shapes, generally having larger ends and a smaller elongated shaft to allow the dog to easily pick them up. The ends may generally be bulbous and may be in the shape of a condyle. Dogs generally will hold one end of a dog chew between their paws in order to chew the body portion.

Furthermore, chew toys may be used as a vehicle to provide interaction between dogs and people. For example, some people like to play fetch with dogs using sticks, balls, flying disks, etc. Other people like to play "tug-of-war" with their animals, using the condyle to grasp the chew. The interaction between pets and their owners has reportedly been found to be not only beneficial to the pet, as it provides the pet with necessary exercise and companionship, but beneficial to their owners as well, with many reported health related benefits.

The prior art is replete with disclosures directed at forming a variety of chew toys. However, there remains a need to provide chew toys that fulfill other requirements. For example, it may also be useful to provide pet chews that are interesting not only to pets, but to the pet owners as well. Additionally, it may also be useful to provide pet chews that enhance the feel of the chew to the pet or owner. Accordingly, a pet toy of novel construction may be directed to sparking the interest of, not only the pet, but children, teenage or adult owners, which may increase the time period that owners engage with their animals.

Further, it may be preferred that such chew toys comprise more than one material such that a variety of chewing experiences may be provided for the pet. Towards that end, if different materials having different physical properties, such as hardness or durability, can be combined into a single chew, one of the materials may be used as a holder for the other. Chew toys have been introduced with removable or interchangeable pieces. However, small children or pets may inadvertently remove these parts creating a hazard to the pet or child. What is needed is a combination of durable chew holder and replaceable components that may be connected to the holder which prevent inadvertent removal of the interchangeable components.

SUMMARY

An aspect of the present disclosure relates to an animal chew. The animal chew may include a body and an end assembly. The body may include first set of threads extending from a first end of the body. The end assembly may include a nut, an end knob and a resilient member. The nut may include a first opening defined in a first end for receiving the first set of threads, a collar extending around at least a portion of an exterior surface of the nut, and one or more keys extending from the exterior surface of the nut. The end knob may include a second opening in a first end of the end knob receiving the nut and defined by a side wall and an end wall. The end knob may also include a ledge extending from at least a portion of the side wall retaining the collar within the opening, and a key way for receiving the one or more keys. The resilient member may be located between the end wall of the end knob and the nut.

Another aspect of the present disclosure relates to an animal chew. The animal chew may include a body and an end assembly. The body may include a first rotating mechanical fastener. The end assembly may be removably affixed to the body and may include a nut, an end knob and a resilient member. The nut may include a second rotating mechanical fastener and a first coupling feature. The end knob may include an opening defined in a first end wherein at least a portion of the nut is received, the opening defined by a side wall and an end wall, including a structure in the side wall to retain the nut. The end knob may also include a second coupling feature to engage the first coupling feature of the nut. The resilient member may bias the first and second coupling features in a disengaged configuration wherein the nut and end knob are rotatable relative to each other. Upon application of a force to the end knob compressing the resilient member, the first and second coupling features may engage and the nut and the end knob may become non-rotatable relative to each other.

A further aspect of the present disclosure relates to an animal chew comprising a first portion and a second portion. The first portion of the animal chew may include a first rotating mechanical fastener. The second portion of the animal chew may be removably affixed to the first portion of the animal chew, wherein the second portion may include a nut, an engageable-disengageable member and a resilient member. The nut may include a second rotating mechanical fastener and a first coupling feature. The engageable-disengageable member may include an opening defined in a first end wherein at least a portion of the nut is received, the opening defined by a side wall and an end wall, including a structure in the side wall to retain the nut. The engageable-disengageable member may also include a second coupling feature to engage the first coupling feature of the nut. The resilient member may bias the first and second coupling features in a disengaged configuration wherein the nut and engageable-disengageable member are rotatable relative to each other. Upon application of a force to the engageable-disengageable member, the first and second coupling features may engage and the nut and the engageable-disengageable member become non-rotatable relative to each other.

BRIEF DESCRIPTION OF THE DRAWINGS

The features, operation and advantages of the invention may be better understood from the following detailed description of the preferred embodiments taken in conjunction with the attached drawings, in which.

DETAILED DESCRIPTION

Figure 1:
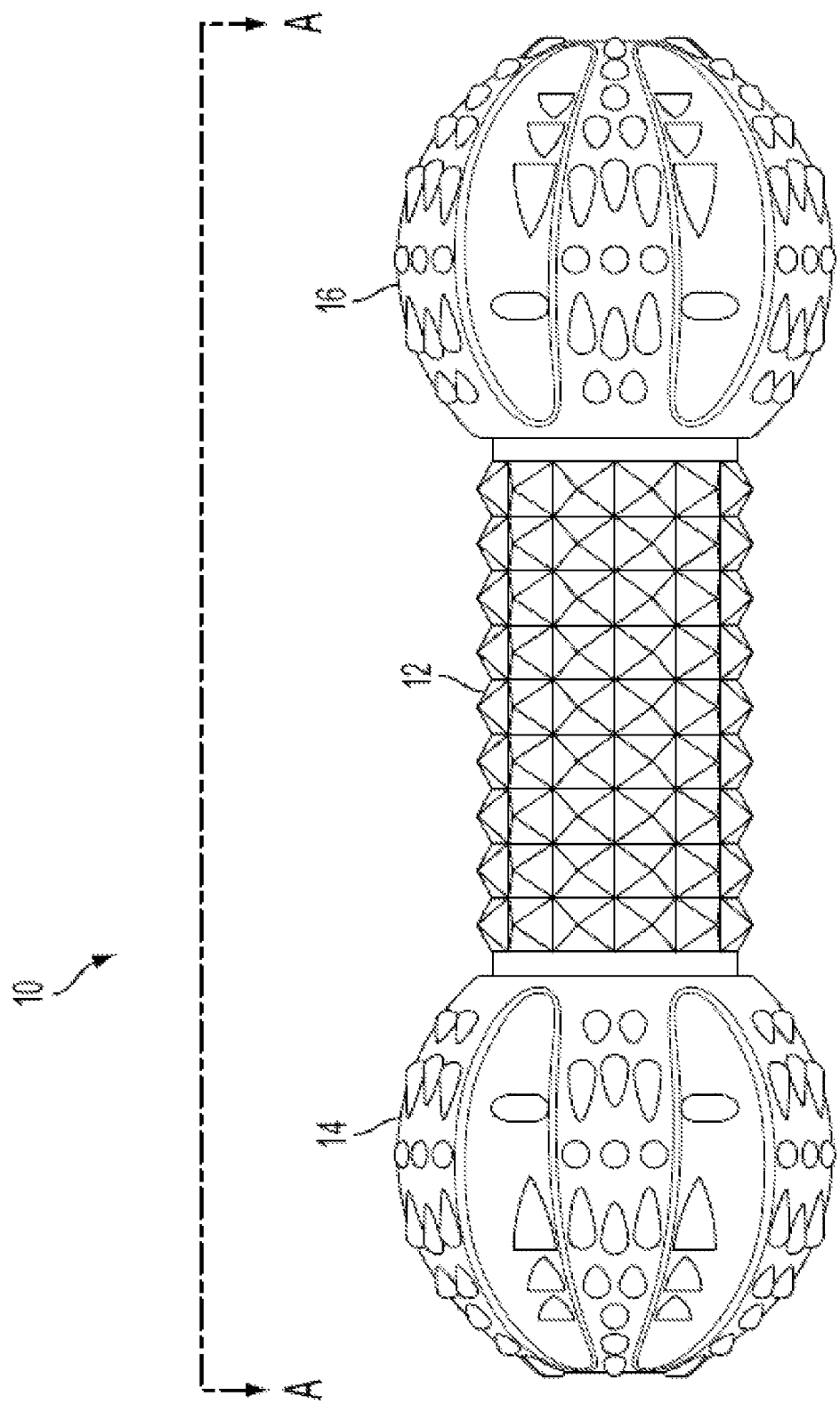
FIG. 1 is a side view of an embodiment of an animal chew according to the present disclosure.

Still other objects and advantages of the present disclosure will become readily apparent to those skilled in the art from the following detailed description, wherein it is shown and described preferred embodiments of the invention. As will be realized the device is capable of other and different embodiments, and its several details are capable of modification in various respects, without departing from the invention. Accordingly, the description is to be regarded as illustrative in nature and not as restrictive. However, in some embodiments the animal chew may consist of or consist essentially of the various features described herein or illustrated in specified drawings.

For elements common to the various embodiments of the present disclosure, the numerical reference character between the embodiments is held constant, but distinguished by the alphanumeric character to the existing reference character. In other words, for example, an element referenced at 10 in the first embodiment is correspondingly referenced at 10A, 10B, and so forth in subsequent embodiments. Thus, where an embodiment uses a reference character to refer to an element, the reference character applies equally, as distinguished by alphanumeric character, to the other embodiments where the element is common.

The present disclosure is directed to animal chews and, more particularly, an animal chew comprising a first portion and a second portion. The first portion of the animal chew may include a first rotating mechanical fastener. The second portion of the animal chew may be removably affixed to the first portion of the animal chew, wherein the second portion may include a nut, an engageable-disengageable member and a resilient member. The nut may include a second rotating mechanical fastener and a first coupling feature. The engageable-disengageable member may include an opening defined in a first end wherein at least a portion of the nut is received, the opening defined by a side wall and an end wall, including a structure in the side wall to retain the nut. The engageable-disengageable member may also include a second coupling feature to engage the first coupling feature of the nut. The resilient member may bias the first and second coupling features in a disengaged configuration wherein the nut and engageable-disengageable member are rotatable relative to each other. Upon application of a force to the engageable-disengageable member, the first and second coupling features may engage and the nut and the engageable-disengageable member become non-rotatable relative to each other. In one embodiment the pet chew may include removable end assemblies allowing for replacement of components forming the pet chew. The engageable-disengageable member, e.g., end assemblies, may include a locking mechanism for preventing the engageable-disengageable member from being inadvertently removed. Specifically, the engageable-disengageable member may be removed only by a person having sufficient motor skill ability to push or pull the engageable-disengageable member and rotate the end assemblies simultaneously, thus preventing those unfamiliar with the mechanism such as children, or some chewing action of the pet, from removing the engageable-disengageable member from the device.

Figure 2:
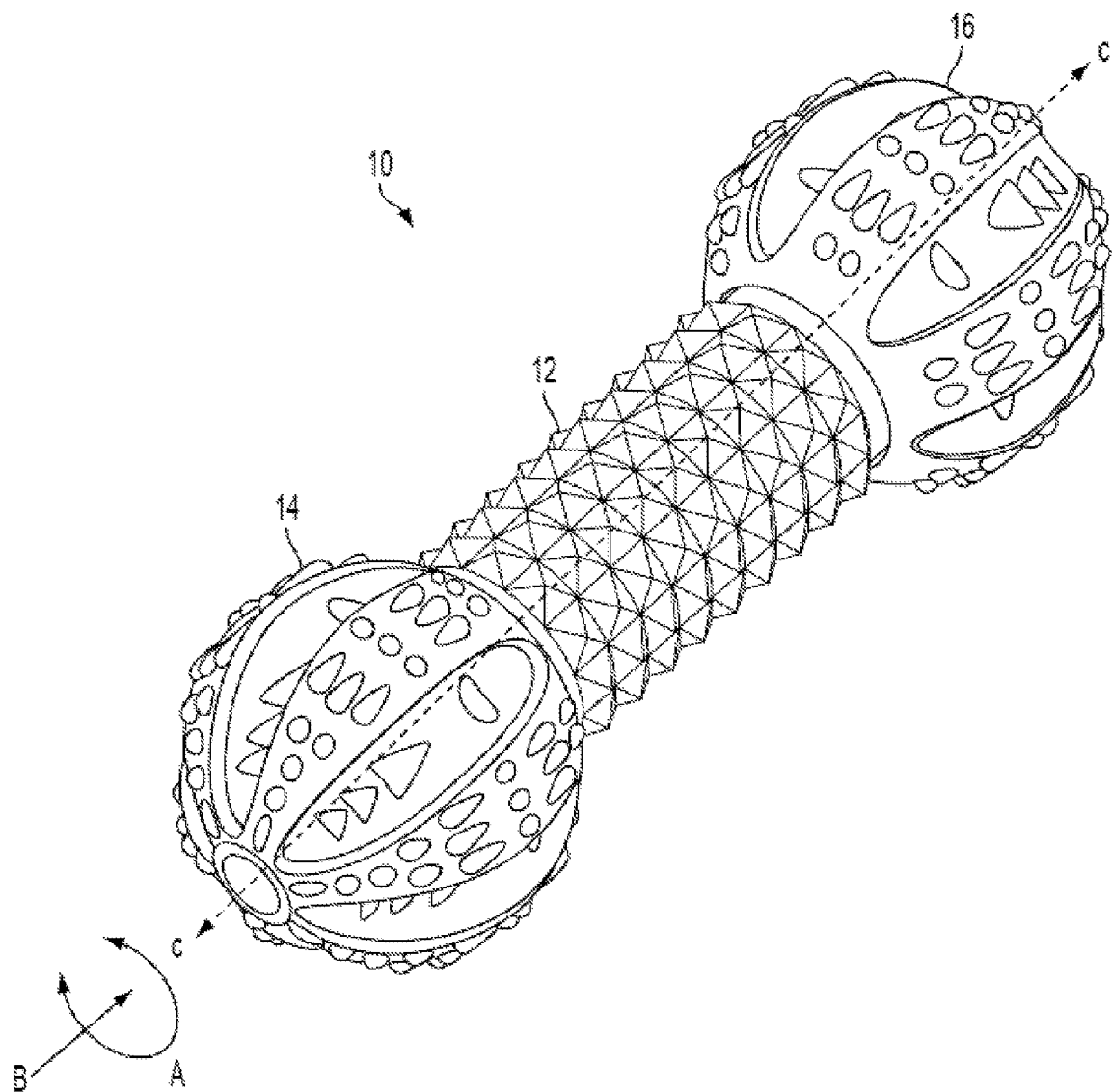
FIG. 2 is a perspective view of the animal chew of FIG. 1.

As illustrated in FIGS. 1 and 2, an animal chew toy 10 may generally include a body 12 and two end assemblies 14, 16 wherein at least one of which may be removably attached to the body 12. The end assemblies 14, 16 may be removed from the body 12 upon the application of pressure while simultaneously rotating the end assembly in a given direction. As illustrated in FIG. 2, the application of force in two directions, 1) around a central axis C-C illustrated by arrow A and 2) substantially parallel to axis C-C towards the body 12 illustrated by arrow B, may aid in preventing inadvertent removal of the end assemblies 14, 16. In other embodiments, the application of force may be in two directions, 1) around a central axis C-C illustrated by arrow A and 2) substantially parallel to axis C-C away from the body 12 opposite the direction illustrated by arrow B. Thus, either a pushing or pulling force may be used in combination with a rotatable force. As illustrated, the animal chew 10 may take the form of a dog bone. However, other forms are contemplated as well, such as animal or objects including snowmen, airplanes, cars, etc.

Figure 3:
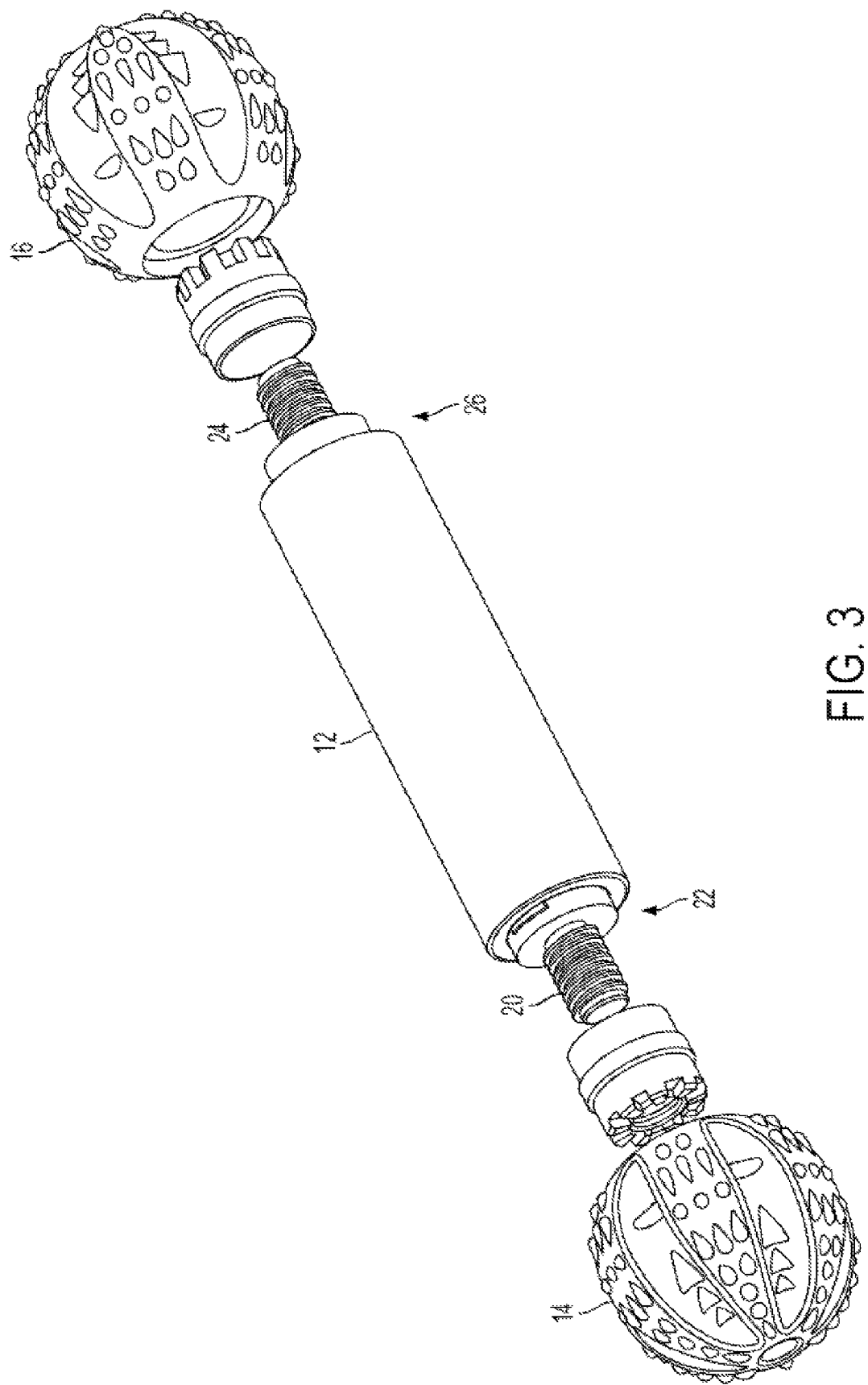
FIG. 3 is an exploded perspective view of an embodiment of the animal chew.

The end assemblies may be mated to the body by a rotating mechanical fasteners, such as threads, separable snap joints, etc., wherein mating of the fasteners relies upon a rotating motion. In one embodiment, illustrated in FIG. 3, the body 12 may include a first rotating mechanical fastener, such as a first set of threads 20 extending from a first end 22 of the body and/or a second set of threads 24 extending from a second or opposing end 26 of the body.

Figure 4:
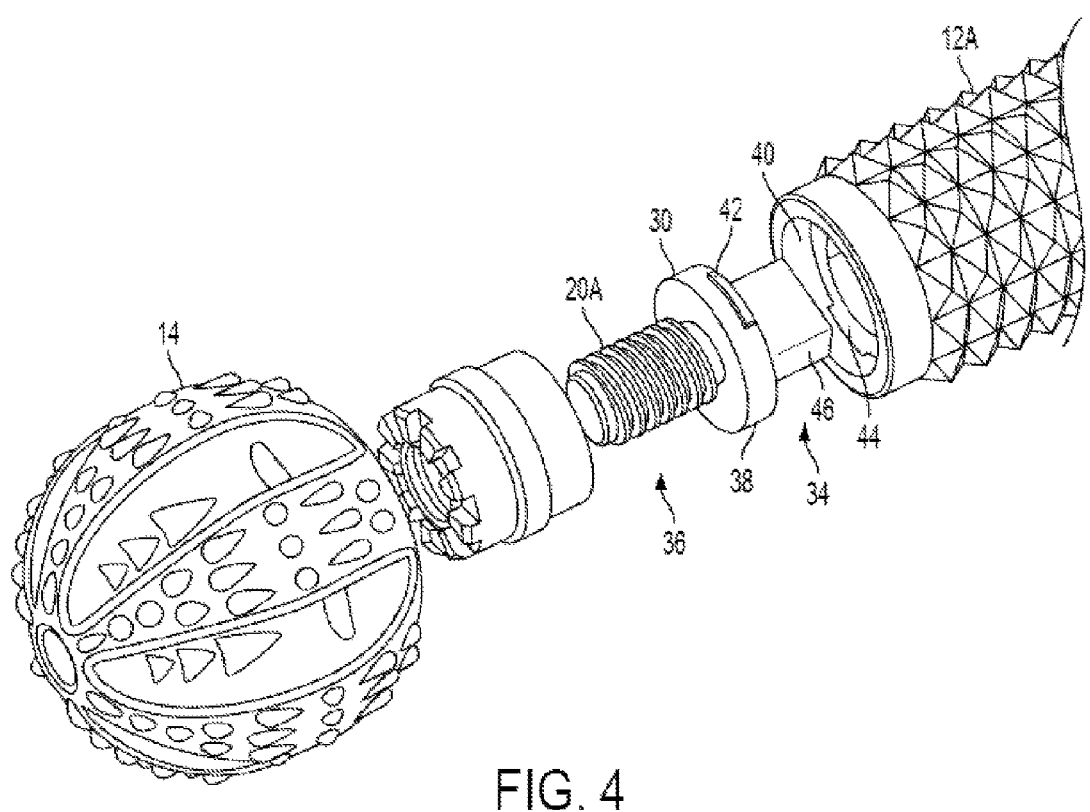
FIG. 4 is an exploded perspective view of an embodiment of the animal chew.

In another embodiment, illustrated in FIG. 4, the threads 20A may be provided on a pin 30, which is retained by the body 12A. The pin 30 may include a first pin end 34, a second pin end 36, and a pin collar 38. The first pin end 34 may be received in an opening 40 defined in the body 12A and retained in the opening 40 by an interference fit between at least a portion of the pin 30 and the opening 40.

In addition to or instead of providing an interference fit, a mechanical fastener may be provided to secure the pin 30 within the body 12. For example, as illustrated in FIG. 4, one or more lips 42 may be provided on the pin collar 38 which may lock into a recess 44 provided within the surface defining the opening 40. The first pin end 34 may have a circular cross-section or the first pin end 34 may include one or more relatively flat surfaces 46 to prevent rotation of the pin 30 relative to the body 12. As alluded to above, the threads 20A may be defined in the second end 36 of the pin 30. The opening 40 may extend along the length of the body 12, as illustrated in FIG. 5, or discrete openings may be provided at each end of the body.

Figure 5:
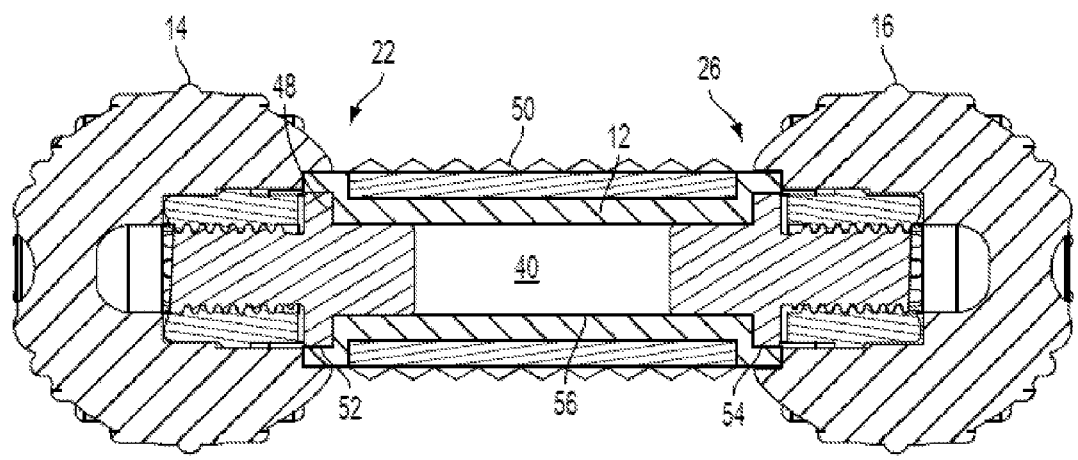
FIG. 5 is a cross-sectional view of the animal chew of FIG. 1, taken along cross-section A-A.

Furthermore, as illustrated in FIG. 5, the body 12 may define a shoulder 48 at the opening 40. In one embodiment, one side of the shoulder 48 may define a first portion 52, 54 of the opening 40 near the ends 22, 26 of the body 12 that has a relatively larger internal diameter than a second portion 56 of the opening 40 extending between the two ends 22, 26 of the body 12. The shoulder 48 may receive the pin collar 38 (illustrated in FIG. 4), or at least a portion thereof. The other side of the shoulder 48 may retain a sleeve 50 over the body 12 as the outer diameter of the shoulder 48 may be greater than the outer diameter of the body 12 and/or the sleeve 50.

In some embodiments, the sleeve 50 may be the same length of the body 12 between the shoulders 52, 54 or may be shorter than the length of the body 12 between the shoulders 52, 54. The sleeve 50 may have a number of features, including raised protrusions or depressions into the surface of the sleeve. In addition, while the sleeve 50 is illustrated as being relatively cylindrical, one or more sleeves may be provided shaped like pieces of meat or fibrous tissues, pieces of vegetables or fruit, or other shapes to provide an overall appearance of a shish kabob or "meat on a bone". In other embodiments, the sleeve may be formed of one or more pieces forming other shapes, that when viewed alone, or in combination with the end assembly may provide the appears of an animal, snowman or other inanimate or animate objects.

The sleeve 50 may be formed of a number of materials including an edible resin composition or a relatively more durable non-consumable material such as nylon, polyurethane, etc. Edible resin compositions may include any starch or carbohydrate of natural or vegetable origin. The starch may include amylose and/or amylopectin and may be extracted from plants, including but not limited to potatoes, rice, tapioca, corn and cereals such as rye, wheat, and oats. The starch may also be extracted from fruits, nuts and rhizomes, or arrowroot, guar gum, locust bean, arracacha, buckwheat, banana, barley, cassaya, konjac, kudzu, oca, sago, sorghum, sweet potato, taro, yams, fava beans, lentils and peas. The starch may be present in the edible resin composition between about 30-99% including all increments and values there between such as levels above about 50%, 85%, etc.

The starch employed herein may be raw starch, which may be understood as starch that has not seen any prior thermal molding history, such as extrusion or other type of melt processing step where the resin is shaped in the presence of heat. The raw starch itself may also be native, which may be understood as unmodified starch recovered in the original form by extraction and not physically or chemically modified. The raw starch may also be in powder form of varying particle size, which may be in the range of about 1-2000 μm, including all ranges and increments therein. Raw starch may be understood as milled and/or pre-sifted starch. It should be understood that the raw starch may also have varying degrees of moisture present. In one embodiment moisture may be present in the raw starch between 1-60%, including all increments and values there between such as 40%, 20%, 10%, etc.

The edible resin compositions herein may be sourced from Manildra Group USA, under the following tradenames: "GEMSTAR 100" which is a refined food grade wheat starch; "GEMSTAR100+" which is a refined food grade wheat starch; "GEM OF THE WEST VITAL WHEAT GLUTEN" which is a powder product by low temperature drying of gluten extracted from wheat flour; "ORGANIC GEM OF THE WEST VITAL WHEAT GLUTEN" which is a powder product by low temperature drying of gluten extracted from organic wheat flour; "ORGANIC GEMSTAR 100" which is a wheat starch extracted from organic what flour; and/or "ORGANIC GEMGEL 100" which is a pregelatinized organic wheat starch In addition, the resin composition may be sourced from ADM under the trade name "EDIGEL 100" which is a wheat resin composition; "AYTEX P" which is a unmodified food grade wheat starch.

Other edible resin materials may be contemplated that may be derived from animal sources such as casein, denatured or hydrolyzed casein, collagen, denatured or hydrolyzed collagen, rawhide, gelatin, other animal protein products, such as animal meal. The resin material may also be derived from plant matter such as gluten, vegetable matter, nuts, such as nut flour, paste or bits, fruit matter, etc. It should also be appreciated that the various edible resin materials, (i.e. starch, animal derived sources, and plant derived sources) may be blended with other edible resin compositions, as well as with thermoplastic materials, and/or thermoset materials.

For example, glutens may be incorporated into the edible resin composition. Gluten may be understood as water-insoluble protein complex extracted from cereal grains such as maize or corn and wheat. The gluten may be present individually or cumulatively between about 0.1-50% by weight of the resin composition and all increments and values there between including 0.1-5.0%, 15%, 25%, etc.

In addition various additives may be incorporated into the edible resin compositions. For example, the edible resin compositions may include cellulose. The cellulose may be, for example, a long-chain polymer of polysaccharide carbohydrate. The cellulose may also be derived or extracted from plants. The cellulose may be incorporated into the resin composition between about 1-15% by weight of the resin composition and any increment or value there between including 4%, 10%, 11%, etc.

Emulsifiers or surfactants may also be incorporated into the edible resin compositions. The emulsifier may be present between about 1-10% by weight of the resin composition and all increments or values there between including 3%, 4%, etc. The emulsifier may include, for example, lecithin, which may be extracted or derived from, for example, egg yolk or soy beans.

The edible resin compositions may also include a plasticizer. The plasticizer may include for example, glycerin. The plasticizer may be incorporated between about 15-30%, including all increments and values there between such as levels greater than 15%, 21%, 27% etc.

A humectant may also be incorporated into the edible resin composition. The humectant may include, for example, oat fiber. The humectant may be incorporated between about 0.1-5% by weight of the resin composition including all intervals and values there between, including 1%, 25%, etc. A humectant may be understood to be any additive that may absorb water in the material.

The edible resin composition may also include water. The water may be introduced into the composition between about 1-40% by weight of the edible resin compositions and any increment or value there between, including 4%, 20-40%, 10-20%, etc. After the product has been formed, the water may be present between 1-20% by weight of the resin composition including all increments or values there between, such as, below 20%, 4%, 5-10%, etc.

The edible composition may generally include a nutraceutical. The nutraceutical may be fermented soya. Fermented soya nutraceuticals are available from Bio Food, Ltd., Pine Brook, N.J. and sold under the general trademark Soynatto™.

The fermented soya is present between about 1-40% by weight of the resin composition, including all increments and values there between, including 10%, 20%, etc.

The edible composition may also include enzymes and/or co-enzymes which are similarly available through Bio Foods, Ltd., Pine Brook, N.J. and sold under the trademark of BT-CoQ10™. This reportedly is a biologically transformed (fermented) cell mitochondrial coenzyme and contains Coenzyme Q10, antioxidants, phytonutrients and cofactor mineral nutrients and other cell constituents. The enzymes and/or co-enzymes may be present between 0.1-10% by weight of the resin composition, including all increments and values there between such as 1%, 5%, etc.

In addition, herbal extracts, vitamins, minerals, colorants, yeast products, soy products, attractants, etc., may also be incorporated into edible composition to provide nutritional value. Yeast products, for example, may include nutritional yeast or brewers yeast such as saccharomyces cerevisiae, dairy yeast such as kluyveromyce marxianus or wine yeast such as saccharomyces fermentati. It should be appreciated that, the edible composition may be provided with a colorant, attractant, flavorant, etc.

Relatively more durable compositions may include relatively hard thermoplastic polymer such as a polyamide or a polyurethane of relatively high hardness (Shore D durometer of 50 or greater). The Shore D may range from 20-80. Other polymers that the sleeve 50 may be composed of include rubber materials, thermoplastic elastomers, nylon copolymers, styrene-butadiene copolymers, polyether-amide copolymers, silicone, polycarbonate, polycarbonate copolymers, thermosetting polymers and natural rubber. Attractants, flavorants and fillers may be incorporated into the relatively more durable compositions. The material may also include a color or light transmitting capacity.

The sleeve 50 may be formed of the same material that the body and/or end assembly components is formed from or from a different material. For example, the body and/or end assembly may be formed of a relatively more durable composition and the sleeve may be formed of a less durable composition, which may include an edible resin composition. A relatively more durable composition may be understood as a composition that has one or more of the following features as compared to the relatively less durable composition: (1) higher Shore Hardness; (2) higher Tm or higher levels of crystallinity; (3) higher molecular weight average such as a relatively high value of the weight average MW (Mw) or number average MW (Mn); (4) higher density; (5) lower relative moisture content; (6) relatively thicker cross-section; (7) higher flexural and/or tensile modulus; (8) higher tensile strength; (9) lower elongation at yield; (10) high notched izod impact strength.

Figure 6:
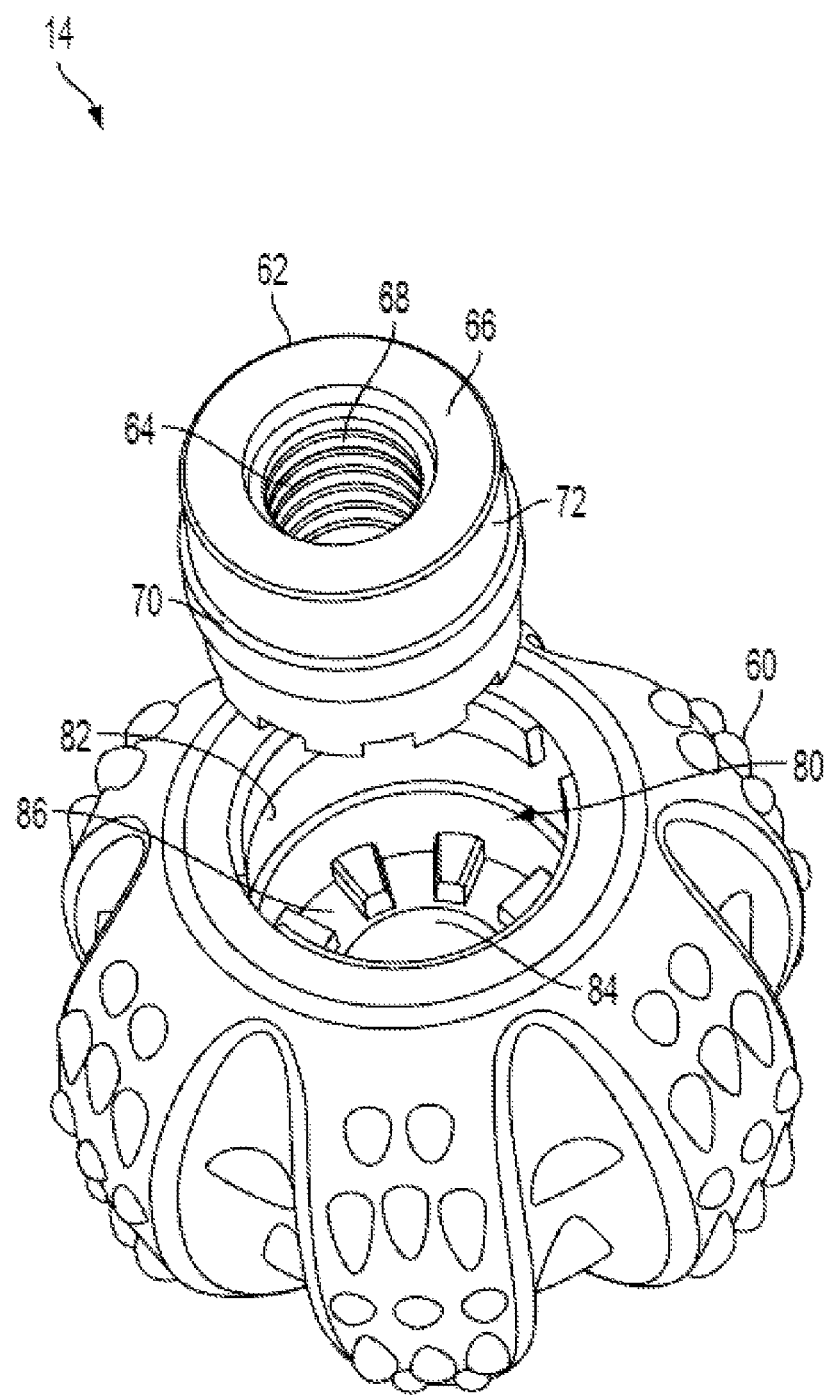
FIG. 6 illustrates an exploded bottom perspective view of an embodiment of an end assembly.

Returning to the description of the various components of the animal chew, FIG. 6 illustrates an exploded view of an end assembly 14 including an end knob 60 and a nut 62. While end assembly 14 is illustrated, end assembly 16 (see FIG. 1) may be constructed in a similar manner. The nut 62 includes a first opening 64 defined in a first end 66 for receiving a second rotating mechanical fastener, which may mate with the first rotating mechanical fastener, such as mating threads 68 for receiving the threads 20, 20A extending from the body 12 (see FIGS. 3 and 4). A collar 70 extends around at least a portion of an exterior surface 72 of the nut 62. In some embodiments, the collar 70 may extend around the entire exterior surface 72 of the nut 62.

In addition, coupling features may be provided on the end knob and the nut, such that when force is applied to the end knob and the end knob is rotated, the nut will rotate with the end knob. Accordingly, a first coupling feature may be provided on the nut and a second coupling feature may be provided on the end knob. The first and second coupling features may mechanically interlock or engage upon the application of a downward force or a downward and rotating force.

Figure 7:
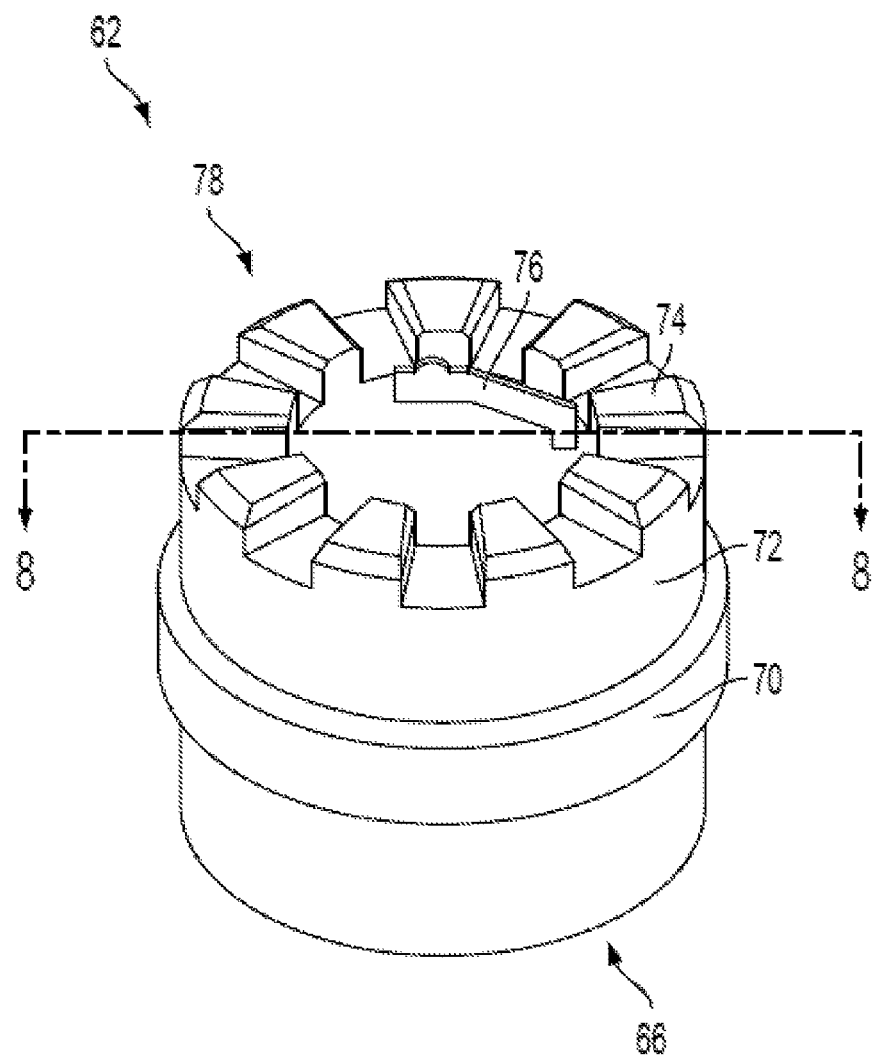
FIG. 7 illustrates a top perspective view of an embodiment of a nut.
Figure 8:
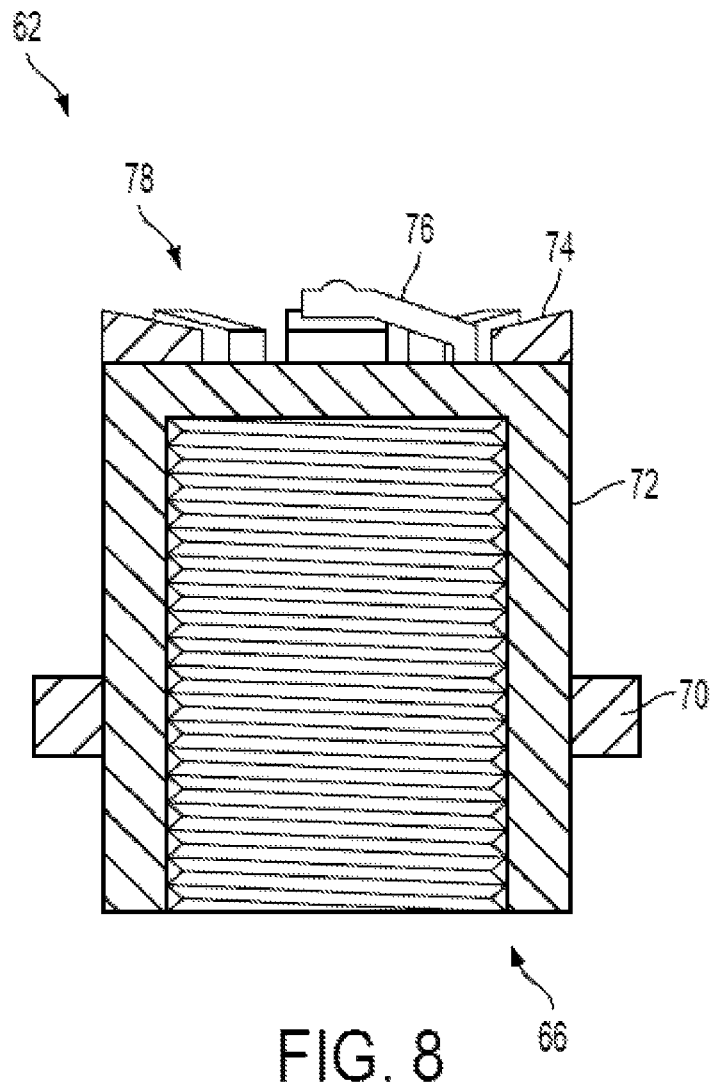
FIG. 8 illustrates a cross-sectional view of an embodiment of a nut.

Expanding upon the above, FIGS. 7 and 8 illustrates an embodiment of a nut 62 including one or more keys 74 extending from the exterior surface of the nut 62. The keys 74 may define a first coupling feature and, as illustrated in FIG. 6, one or more key ways 86 provided at the opening end wall 84 of the end knob 60 may define a second coupling feature. As illustrated, the keys 74 may be arranged in an annular pattern spaced a regular intervals. The keys 74 may also be spaced at irregular or random intervals. Furthermore, 1 to 20 keys may be present, including all values therein. The keys may also extend from the side of the exterior surface of the nut, such as projecting from the collar. Other coupling features may include, for example, one or more slots or channels provided in the nut and one or more tabs or raised features configured to be received in the slots or channels provided in the end knob, or vice versa.

A resilient member may also be provided between the end knob and the nut biasing the coupling feature in a disengaged state, as described further herein. Turning again to FIGS. 7 and 8, the resilient member 76 may include a cantilevered projection extending from an end 78 of the nut 62 opposite the first end 66. In other embodiments, the resilient member may also extend from the collar. The resilient member 76 may be integral to the nut 62, all being formed as a single piece, or the resilient member may be a separate piece attached to the nut. In further embodiments, a compression spring may be provided as a resilient member, which may again be positioned at an end of the nut or around the nut extending up from the collar. The resilient member may also extend from the side wall 82 or end wall 84 of the end knob 60 (see FIG. 6).

Figure 9:
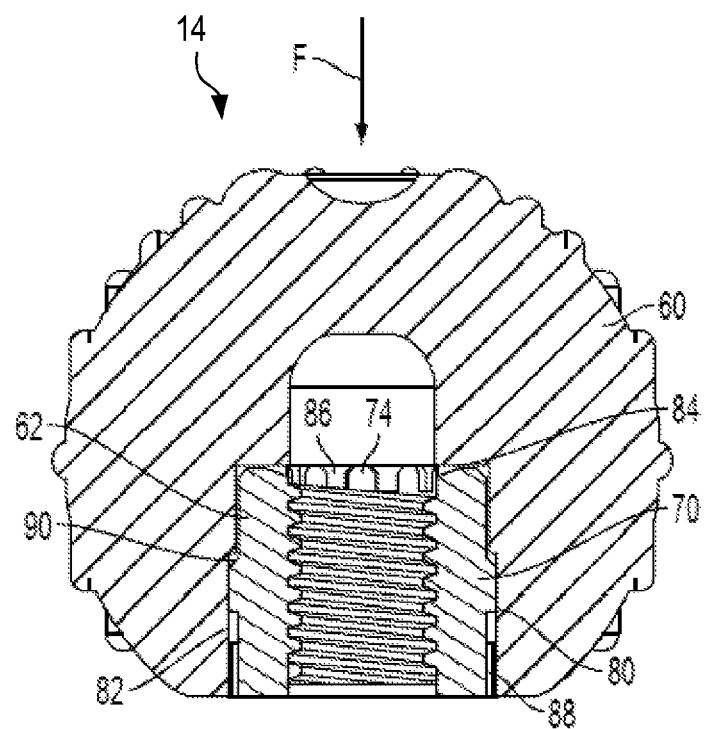
FIG. 9 illustrates a cross-sectional view of an embodiment of an end assembly, wherein the coupling feature is engaged.
Figure 10:
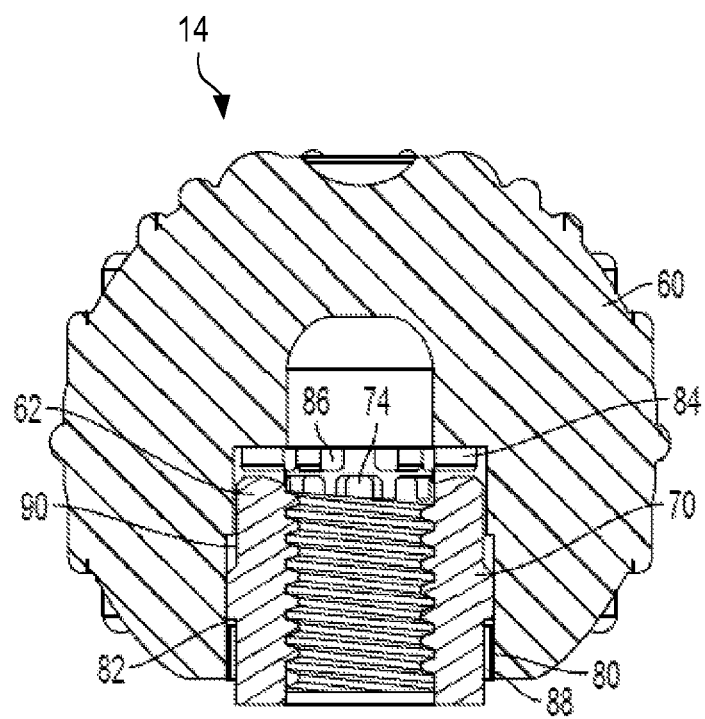
FIG. 10 illustrates a cross-sectional view of an embodiment of an end assembly, wherein the coupling feature is disengaged.

FIGS. 9 and 10 illustrate an embodiment of an end assembly 14, wherein FIG. 9 illustrates the first and second coupling features 74, 86 engaged and FIG. 10 illustrates the first and second coupling features 74, 86 disengaged. Again, while end assembly 14 is illustrated, either end assembly 14, 16 (see FIG. 1) may be constructed in the following manner.

As alluded to above, the end knob 60 may define an opening 80 for receiving the nut 62, wherein the opening 80 may be defined by side walls 82 and an end wall 84. As illustrated, one or more key ways 86 may be provided as a second coupling feature in the end wall 84 to receive the keys 74 provided on the nut 62 (see FIGS. 6 through 8). As illustrated in FIG. 9, when a force F is provided on the end knob 60, the resilient member may be compressed and the coupling features may engage, i.e., keys 74 extending from the nut 62 may mate with the key ways 86 defined in the end knob 60. Engaging the end knob 60 with the nut 62 may allow the nut to be rotated with the end knob 60 when the end knob 60 is rotated. Thus, the nut 62 and the end knob 60 may be non-rotatable relative to each other. Alternatively, as illustrated in FIG. 10, when force F is not applied to the resilient member (not illustrated), the resilient member 76 (see, for example, FIGS. 7 and 8) may extend the nut 62 away from the end wall 84. In addition, the coupling features may disengage, i.e., the keys 74 are disengaged from the key ways 86 and if the end knob 60 is rotated, it may rotate independently of the nut 62. Therefore, in the disengaged configuration, the end knob 60 and nut 62 may be rotatable relative to each other. In some embodiments, the keys may be provided on the end knob and the key ways may be provided on the nut.

The end knob 60 may also include structural feature in the side wall 82 for retaining the nut 62 within the opening 84. For example, a ledge 88 may be provided extending from the side wall 82. In one embodiment, the collar 70 of the nut 62 may interfere with the ledge 88, wherein the outer diameter of the collar 70 may be relatively larger than the inner diameter of the ledge 88. The collar 70 of the nut 62 may be forcefully inserted past the ledge 88 and into the opening 80. The nut 62 may then be retained by the interference between the collar 70 and the ledge 88. The collar 70, and therefore the nut 62, may slide up and down within the opening 80, between the ledge 88 and a stop shoulder 90 formed in the side wall 82. The stop shoulder 90 may prevent damage to the portion of the coupling feature located in the end knob when the nut is inserted into the end knob or force is applied biasing the resilient member.

Figure 11:
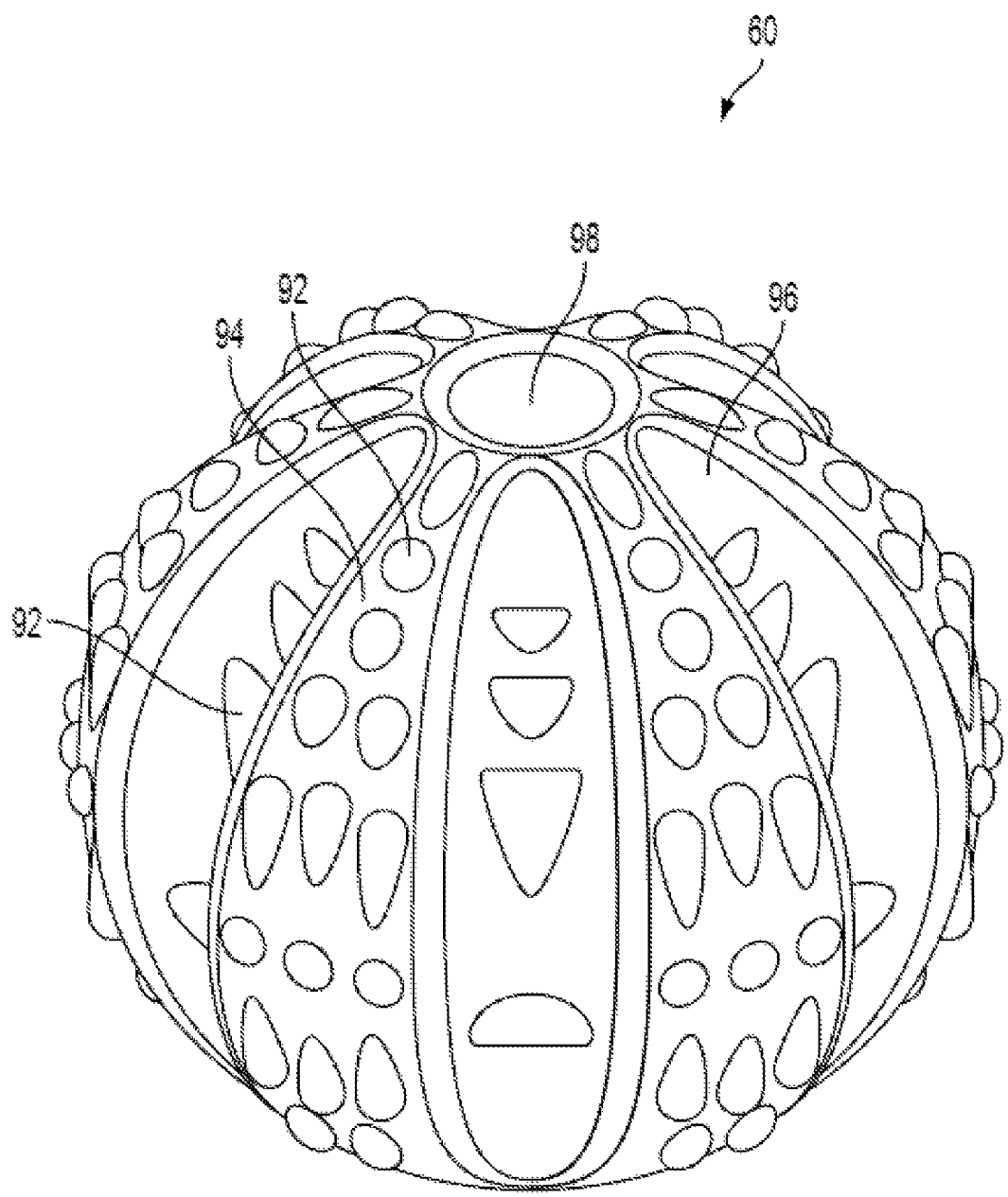
FIG. 11 illustrates a top perspective view of an embodiment of an end knob.

Turning to FIG. 11, the end knob 60 may also include one or more discrete features 92 raised from the surface 94 of the end knob 60. The discrete features 92 may exhibit a number of geometries and may be regularly or irregularly spaced. Furthermore, the end knob 60 may also include one or more channels 96 defined in the surface 94. The channels may be spaced radially around the end knob 60 at regular or irregular intervals. In some embodiments, the discrete features 92 may be present in the channels 96 as well as on the surface 94 or instead of being present on the surface. As may be appreciated, the channels 96 and/or the discrete features may provide increased surfaces or additional surface area to that aid in the application of torque to the end knob 60. Furthermore, additional depressions 98 may also be included in the surface 94.

Figure 12:
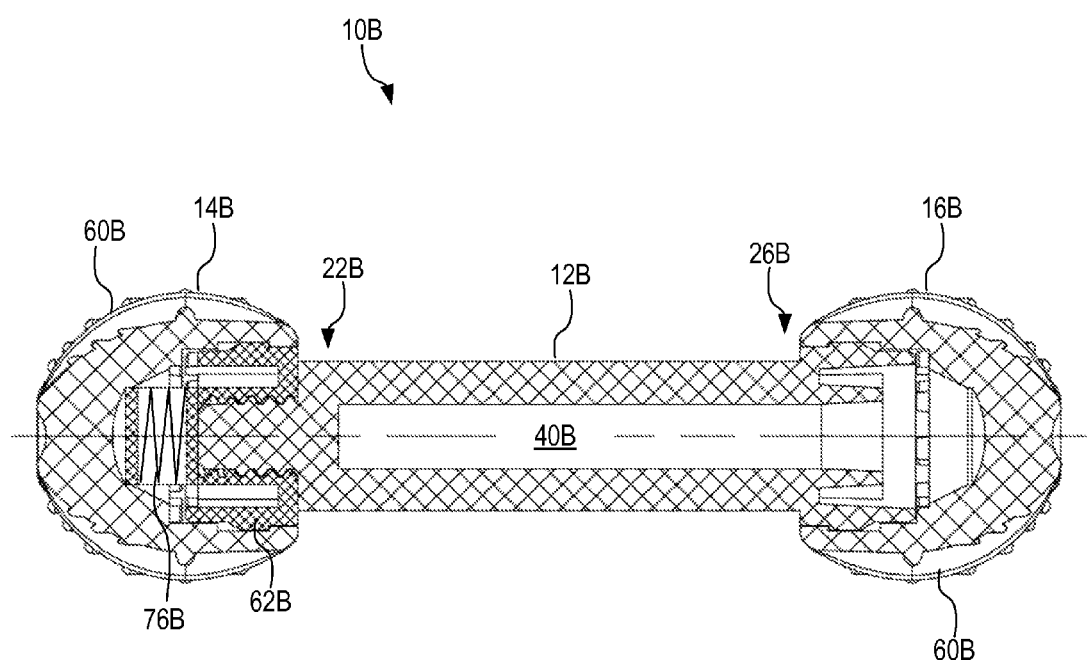
FIG. 12 illustrates a cross-sectional view of another embodiment of a body and end assemblies.

Another exemplary embodiment of a body 12B, which may receive a sleeve, and end assemblies 14B, 16B is illustrated in FIG. 12. As illustrated, in this embodiment, one of the two end assemblies 14B is removably affixed to the body 12B and the other end assembly 16B is affixed to the body 12B in a manner that prevents the second end assembly 16B from easily being removed.

Figure 13:
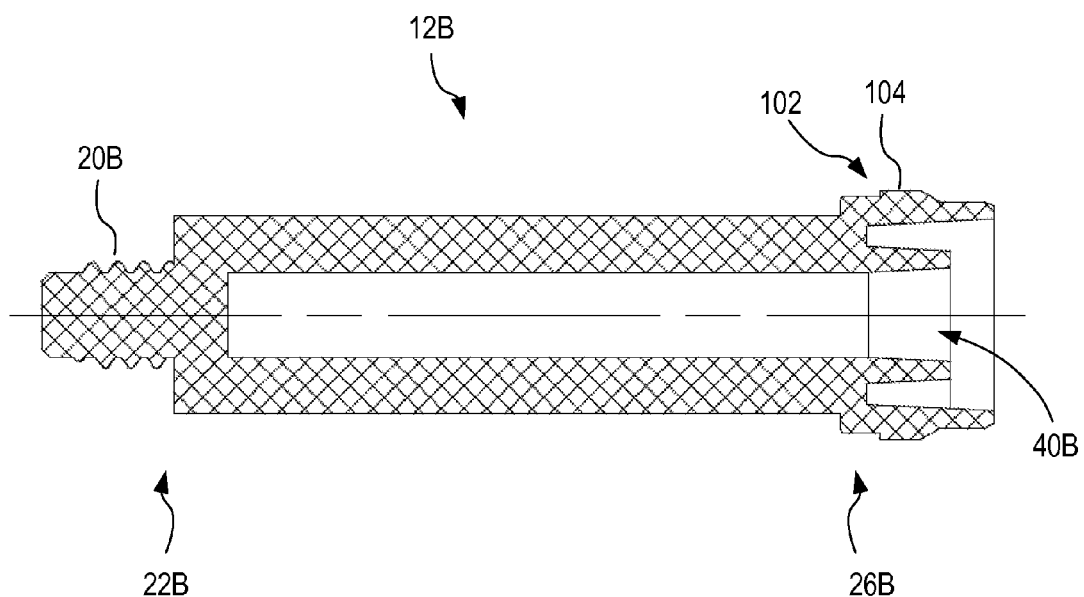
FIG. 13 illustrates a cross-sectional view of an embodiment of a body.
Figure 14:
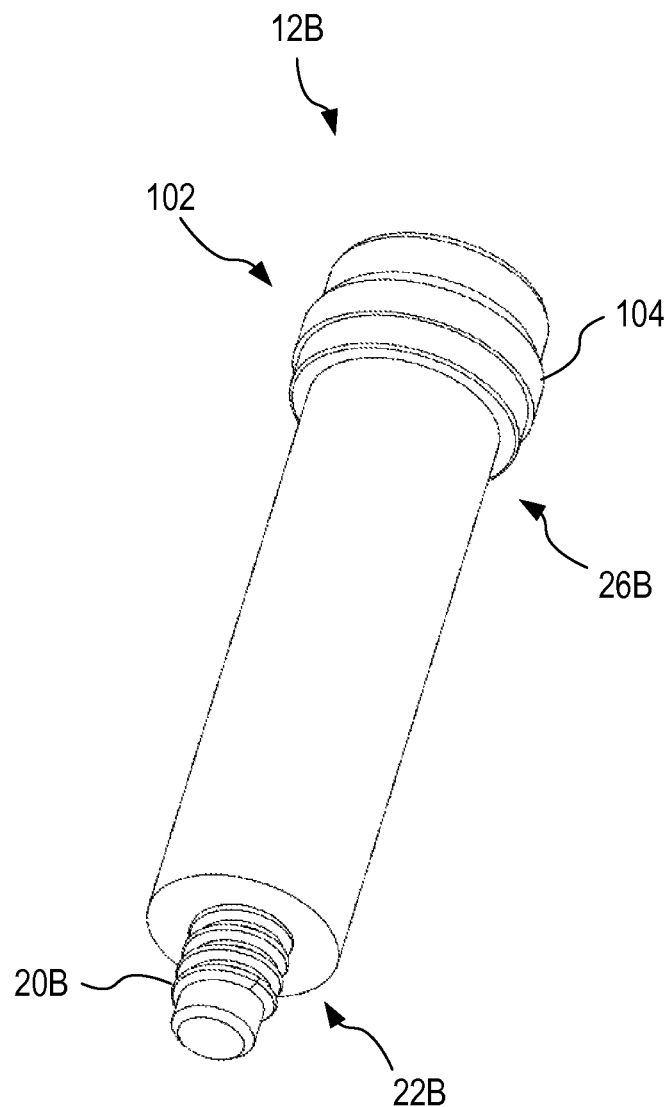
FIG. 14 illustrates a perspective view of the body of FIG. 13.

FIGS. 13 through 14 illustrate a cross-sectional view and a perspective view, respectively, of the body 12B. A rotating mechanical rotating mechanical fastener 20B, such as threads, may be provided at a first end 22B of the body 12B. At the second end 26B of the body 12B a mechanical interlocking device 102 may be provided, which may affix the end 26B of the body 12B with an end assembly 16B, which may include or be limited to an end knob 60B (see FIG. 12). The mechanical interlocking device 102 may include a snap joint assembly including a collar 104.

Figure 15:
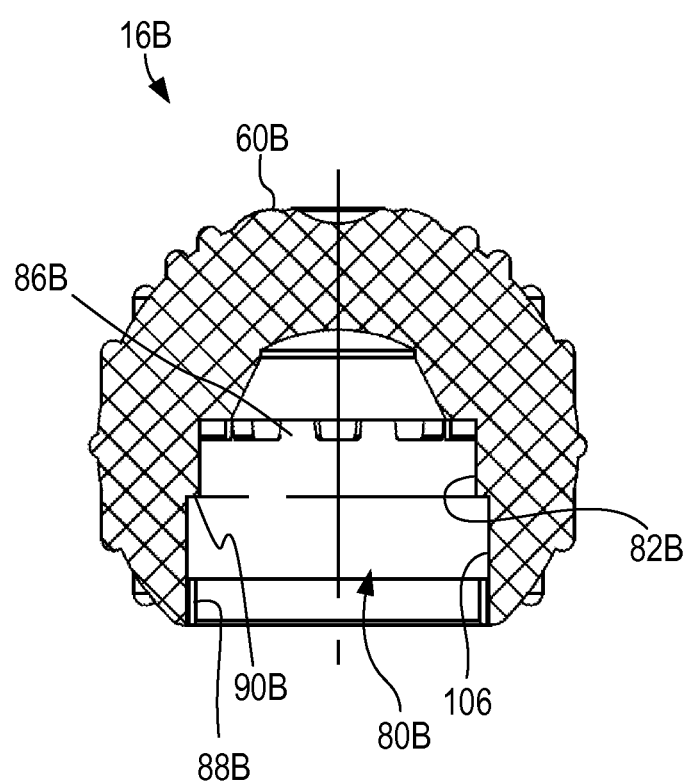
FIG. 15 illustrates a cross-sectional view of an embodiment of an end knob.

As illustrated in FIG. 15, a structure 106, such as a groove, may be provided in the side wall 82B of an opening 80B in the end knob 60B to receive the mechanical interlocking device 102 (see FIGS. 13 and 14). Similar to the embodiments discussed above, the groove 106 in the end knob 60B may be defined, for example, between a ledge 88B and a stop shoulder 90B. Other mechanical interlocking devices may include, for example, press fit assemblies. Furthermore, the end knob 60B may include a coupling feature 86B, such as keys or key ways.

Referring again to FIGS. 12 and 13, an opening 40B may be defined in the body 12B extending from the second end 26B and ending near the first end 22B. Alternatively, the opening 40B may extend through only a portion of the body 12B and end closer to the second end 26B than what is illustrated. In addition, similar to the illustration in FIG. 5, the opening 40B may also extend all the way through the body 12B.

Figure 16:
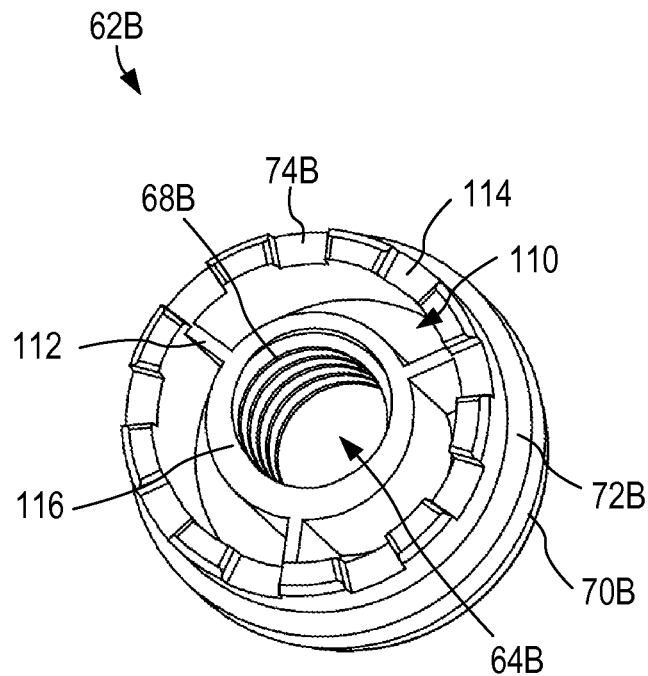
FIG. 16 illustrates a top perspective view of an embodiment of a nut.
Figure 17:
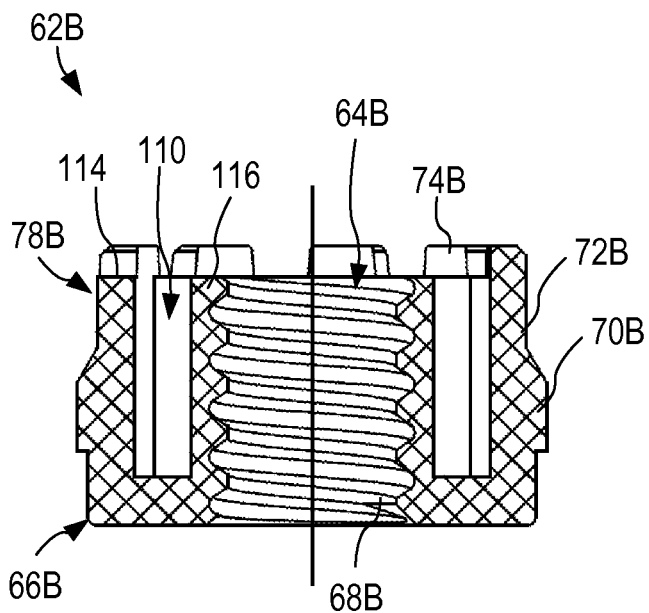
FIG. 17 illustrates a cross-sectional view of an embodiment of a nut.

FIGS. 16 and 17 illustrate another example of a nut 62B, which may be used with either of the above described embodiments and may be received in the end knob 60 (see FIG. 12). The nut 62B may again include a coupling feature 74B, such as one or more keys or keyways defined on one end 78B (see FIG. 17) of the nut 62B. A collar 70B may extend around at least a portion of the exterior surface 72B of the nut 62B. The opening 64B defined in the nut 62B may extend along the length and through the nut 62B. In addition, the nut 62B may include a rotating mechanical fastener 68B, such as threads, that mate with the rotating mechanical fastener 20B extending from the body (see FIGS. 13 and 14).

A recess 110 may be provided an end 78B of the nut 62B including the coupling feature 74B. The recess 110 may extend through a portion of the nut 62B. Furthermore, one or more ribs 112 may extend between the exterior wall 114 of the nut 62B and the interior wall 116 of the nut 62B. The ribs 112 may extend the entire length of the recess 110, i.e., from one end 66B of the nut 62B to the other 78B, or along a portion of the length of the recess 110. The resilient member 76B, such as a spring (see FIG. 12), may be positioned between the exterior wall 114 and the interior wall 116 and may, in some embodiments, rest upon the ribs 112. The resilient member may, therefore, be located within the opening of the end knob and between the end wall of the end knob and the nut. The spring may be a compression spring and may take on the form of many shapes, such as a helix or one or more washers of various geometries (curved spring, wave spring, etc.). In other embodiments, the recess may be provided in the other end of the nut or recesses may be provided in both ends of the nut. Again, the resilient member may be biased so as to disengage the coupling features of the nut and the end knob, wherein the end knob may spin freely of the nut. When the resilient member is in compression, the coupling features may engage, preventing the end knob from rotating relative to the nut.

Figure 18:
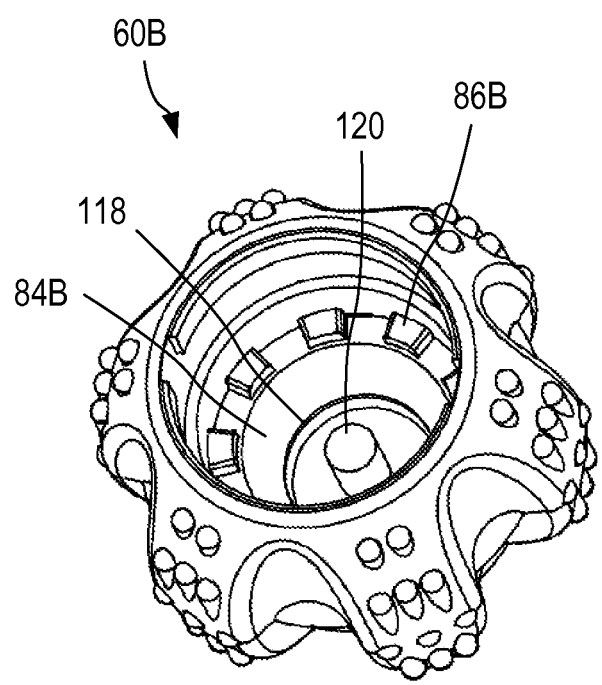
FIG. 18 illustrates a bottom perspective view of an embodiment of an end knob.

In addition to the features described above, as illustrated in FIG. 18, the end knob 60B may also optionally include a recess 118 defined in the end wall 84B for receiving the resilient member 76B (see FIG. 12). A boss 120 may also be provided extending from the end wall 84B. The boss 120 may help guide and/or seat the resilient member 76B (see FIG. 12) in the recess 118, preventing the resilient member 76B from tilting or otherwise dislocating within the end knob 60B.

In a further embodiment, the coupling features may include keys extending from the collar of the nut towards the first surface/opening of the nut and key ways defined in the structural feature retaining the nut, i.e., the ledge, to receive the keys. A resilient member, such as a tension spring, may be provided biasing the nut towards the end wall of the end knob and away from the opening of the end knob, disengaging the coupling features, such that the nut and end knob are rotatable relative to each other. Upon pulling the end knob away from the body, the coupling features may engage allowing for the nut to rotate with the end knob, wherein the nut and end knob are non-rotatable relative to each other.

While the various components described herein may be particularly conducive to injection or compression molding, it is contemplated that other processes may also be used to form the individual components. For example, the body and sleeve may be extruded.

As may be appreciated, the use of both a downward or upward force to engage the coupling feature and a rotating force to mate the rotating mechanical fastener may reduce or prevent the ability of an animal or a child to remove an end assembly from the body of the animal chew. Furthermore, the ability of the end knob to "float" over the nut when the coupling feature is disengaged may reduce the wear on the threads when an animal is bearing against the chew during use. In addition, if an animal does chew at least partially through the end assembly, the end knob may protect the nut and the threads from being damaged and allowing for the replacement of the end assembly and further use of the body.

It may also be appreciated that the replaceable nature of the various components of the animal chew described herein may allow for the substitution of worn components that have been chewed or otherwise damaged while still leaving the remaining portions of the animal chew intact. Thus, the present animal chew may result in less waste and may be more environmentally friendly than prior chews that must be disposed of as a whole. Furthermore, the various components may be substituted with components having different features. For example, as alluded to above end knobs may be substituted with other end knobs exhibiting different material properties or different discrete raised features.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An animal chew, comprising:
   a body including an opening;
   a pin comprising a first end, a second end and a pin collar defined between said first end of said pin and said second end of said pin, wherein said first end of said pin is at least partially retained within said opening and includes flat surfaces to prevent rotation of said pin relative to said body, where said second end of said pin includes a first set of threads; and
   an end assembly comprising
      a nut including a first opening defined in a first end for receiving said first set of threads, a collar extending around at least a portion of an exterior surface of said nut, and one or more keys extending from said exterior surface of said nut at a second end of said nut opposing the first end of said nut;
      an end knob including a second opening in a first end of said end knob receiving at least a portion of said nut and defined by a side wall and an end wall, a ledge extending from at least a portion of said side wall retaining said collar within said second opening, a stop shoulder formed in said side wall wherein said collar is slidable between said ledge and said stop shoulder, and a key way for receiving said one or more keys, wherein said stop shoulder is provided between said ledge and said key way, and
      a resilient member located between said end wall of said end knob and said nut.

2. The animal chew of claim 1, wherein said body includes a second set of threads extending from a second end of said body and said animal chew further comprises a second end assembly.

3. The animal chew of claim 1, further comprising a second end assembly including a second end knob, wherein said body further comprises a mechanical interlocking device opposing said first set of threads and said mechanical interlocking device is received by said second end knob.

4. The animal chew of claim 1, further comprising a sleeve extending over at least a portion of said body.

5. The animal chew of claim 4, wherein said sleeve comprises an edible material.

6. The animal chew of claim 4, wherein said body is formed of a relatively more durable material than said sleeve.

7. The animal chew of claim 1, wherein said resilient member includes a compression spring.

8. The animal chew of claim 1, wherein said resilient member is biased extending said nut away from said end knob end wall and disengaging said one or more keys from said key way.

9. The animal chew of claim 8, wherein upon application of a force to said end knob compressing said resilient member, said one or more keys are engaged with said key way.

10. The animal chew of claim 1, wherein said opening in said body extends along the entire length of said body.

11. The animal chew of claim 1, wherein said pin collar includes a lip and said opening in said body includes a recess for receiving said lip and said lip locks into said recess.

12. An animal chew, comprising:
    a body including an opening;
    a pin comprising a first end, a second end and a pin collar defined between said first end of said pin and said second end of said pin, wherein said first end of said pin is at least partially retained within said opening and includes flat surfaces to prevent rotation of said pin relative to said body, where said second end of said pin includes a first rotating mechanical fastener; and
    an end assembly removably affixed to said body, wherein said end assembly comprises:
       a nut including a second rotating mechanical fastener at a first end, a collar extending around at least a portion of an exterior surface of said nut, and a first coupling feature extending from a second end of said nut opposing said first end;
       an end knob including an opening defined in a first end wherein at least a portion of said nut is received, said opening defined by a side wall and an end wall, including a ledge to retain said nut and a stop shoulder in said side wall, wherein said collar is slidable between said ledge and said stop shoulder;
       the end knob including a second coupling feature to engage said first coupling feature of said nut, wherein said stop shoulder is provided between said ledge and said second coupling feature; and
       a resilient member biasing said first and second coupling features in a disengaged configuration wherein said nut and end knob are rotatable relative to each other, wherein upon application of a force to said end knob, said first and second coupling features engage, said nut engages said stop shoulder, and said nut and said end knob become non-rotatable relative to each other.

13. The animal chew of claim 12, wherein said first rotating mechanical fastener includes a set of threads and said second rotating mechanical fastener includes a mating set of threads.

14. The animal chew of claim 12, wherein said first coupling feature includes one or more keys and said second coupling feature includes one or more key ways configured to receive said keys.

15. The animal chew of claim 12, further comprising a sleeve mounted on said body.

16. The animal chew of claim 15, wherein said sleeve is formed of an edible resin composition.

17. The animal chew of claim 12, further comprising a second end knob, wherein said body further comprises a mechanical interlocking device opposing said first rotating mechanical fastener and said mechanical interlocking device is received by said second end knob.

18. An animal chew comprising:
    a first portion of said animal chew including an opening;
    a pin comprising a first end, a second end and a pin collar defined between said first end of said pin and said second end of said pin, wherein said first end of said pin is at least partially retained within said opening and includes flat surfaces to prevent rotation of said pin relative to said body, where said second end of said pin includes a first rotating mechanical fastener; and a second portion of said animal chew removably affixed to said first portion of said animal chew, wherein said second portion comprises:

a nut including a second rotating mechanical fastener at a first end, a collar extending around at least a portion of an exterior surface of said nut, and a first coupling feature extending from a second end opposing said first end;

an engageable-disengageable member including an opening defined in a first end wherein at least a portion of said nut is received, said opening defined by a side wall and an end wall, including a ledge to retain said nut and a stop shoulder, wherein said collar is slidable between said ledge and said stop shoulder;

the engageable-disengageable member including a second coupling feature to engage said first coupling feature of said nut, wherein said stop shoulder is provided between said ledge and said second coupling feature; and a resilient member biasing said first and second coupling features in a disengaged configuration wherein said nut and engageable-disengageable member are rotatable relative to each other, wherein upon application of a force to said engageable-disengageable member, said first and second coupling features engage and said nut and said engageable-disengageable member become non-rotatable relative to each other.

* * * * *